United States Patent [19]

Borders, Jr. et al.

[11] 4,135,082
[45] Jan. 16, 1979

[54] ELECTRICAL PULSE TRAIN COMPARATOR

[75] Inventors: Raymond S. Borders, Jr., Claymont; Michael H. Shearon, Newark, both of Del.

[73] Assignee: E. I. Du Pont de Nemours and Company, Wilmington, Del.

[21] Appl. No.: 832,975

[22] Filed: Sep. 13, 1977

[51] Int. Cl.$^2$ ............................................. H03K 21/08
[52] U.S. Cl. ........................... 235/92 CC; 235/92 FQ; 235/92 EA; 235/92 PE; 235/92 R; 235/103.5 R
[58] Field of Search ......... 235/92 FQ, 92 TF, 92 CC, 235/92 PS, 92 FP, 92 EA, 92 CA, 92 PE, 103.5 R; 340/268

[56] References Cited

U.S. PATENT DOCUMENTS

| | | | |
|---|---|---|---|
| 2,851,596 | 9/1958 | Hilton | 235/92 TF |
| 3,560,723 | 2/1971 | Kamachi | 235/92 EA |
| 3,602,699 | 8/1971 | Kamachi et al. | 235/92 EA |
| 3,808,407 | 4/1974 | Ratz | 235/92 FQ |
| 3,962,567 | 6/1976 | Oicles et al. | 235/92 FQ |

*Primary Examiner*—Joseph M. Thesz

[57] ABSTRACT

A digital data acquisition system wherein a succession of electrical impulses whose frequency is characteristic of an operation to be measured is compared with a reference electrical pulse series.

1 Claim, 3 Drawing Figures

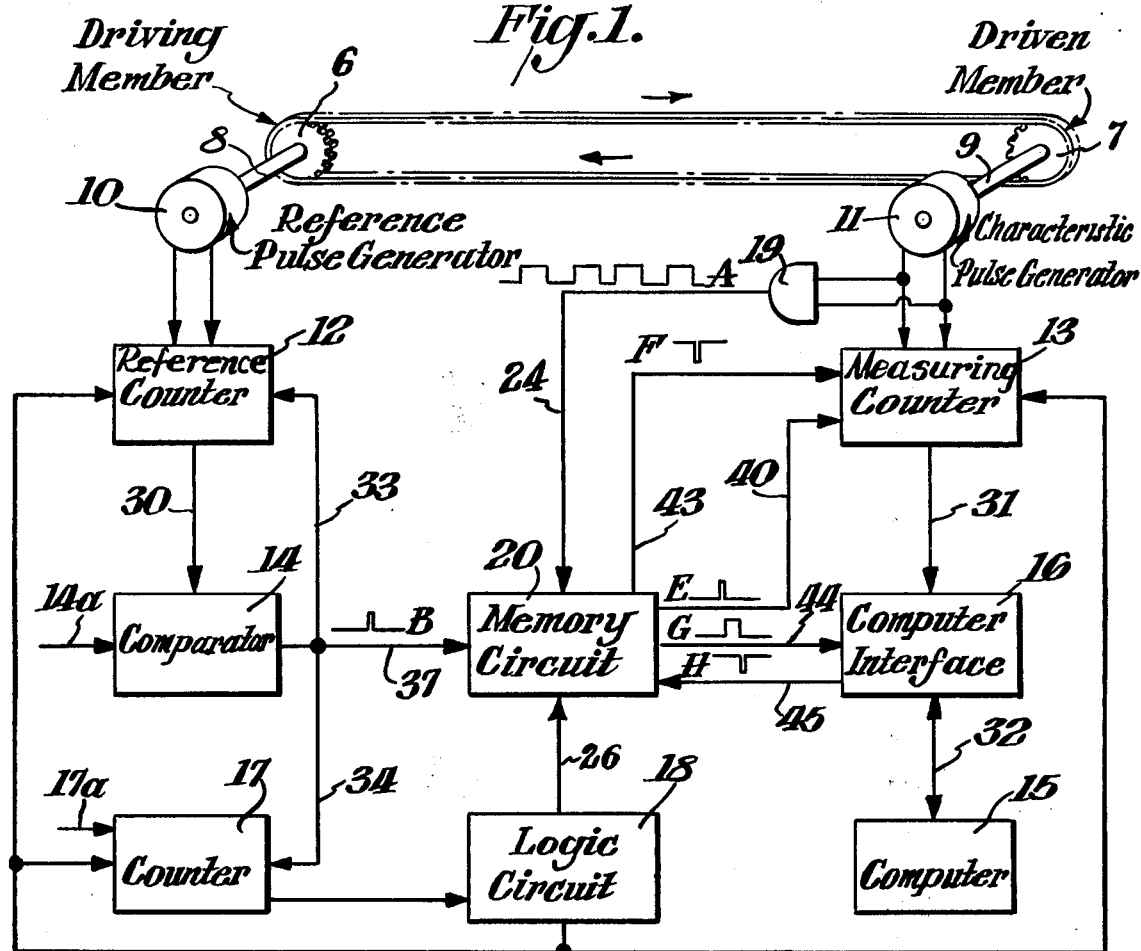
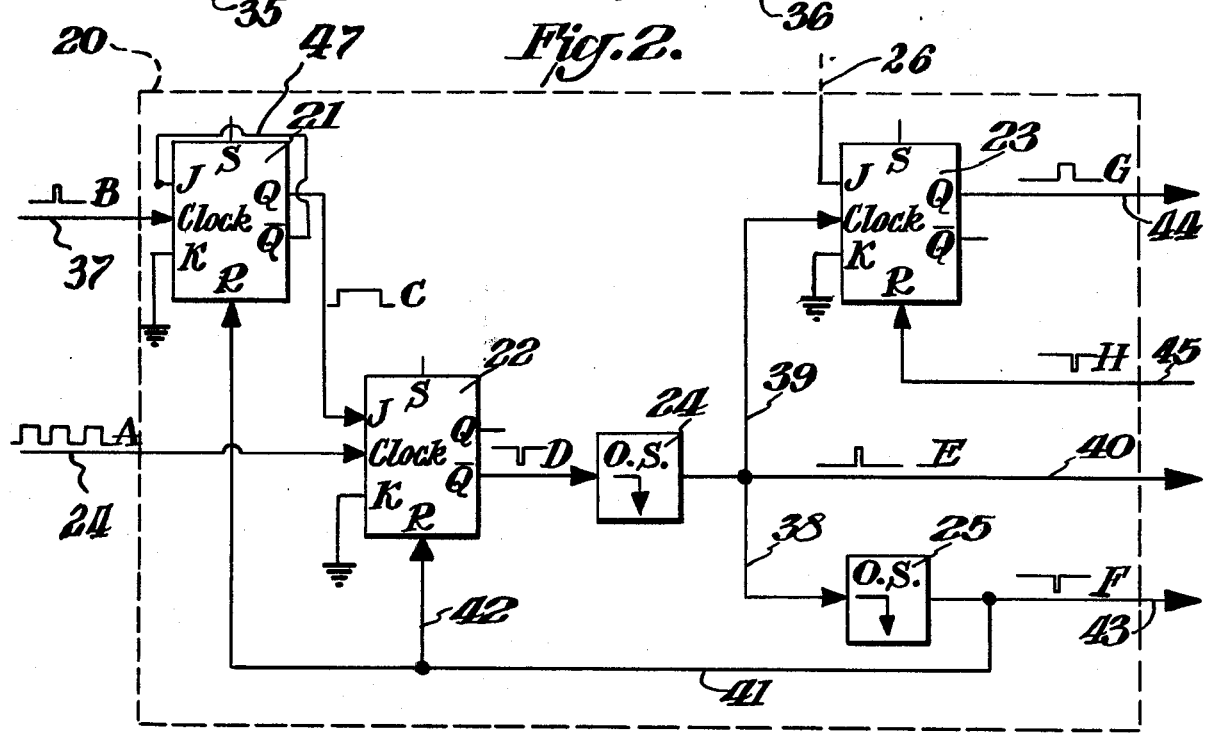

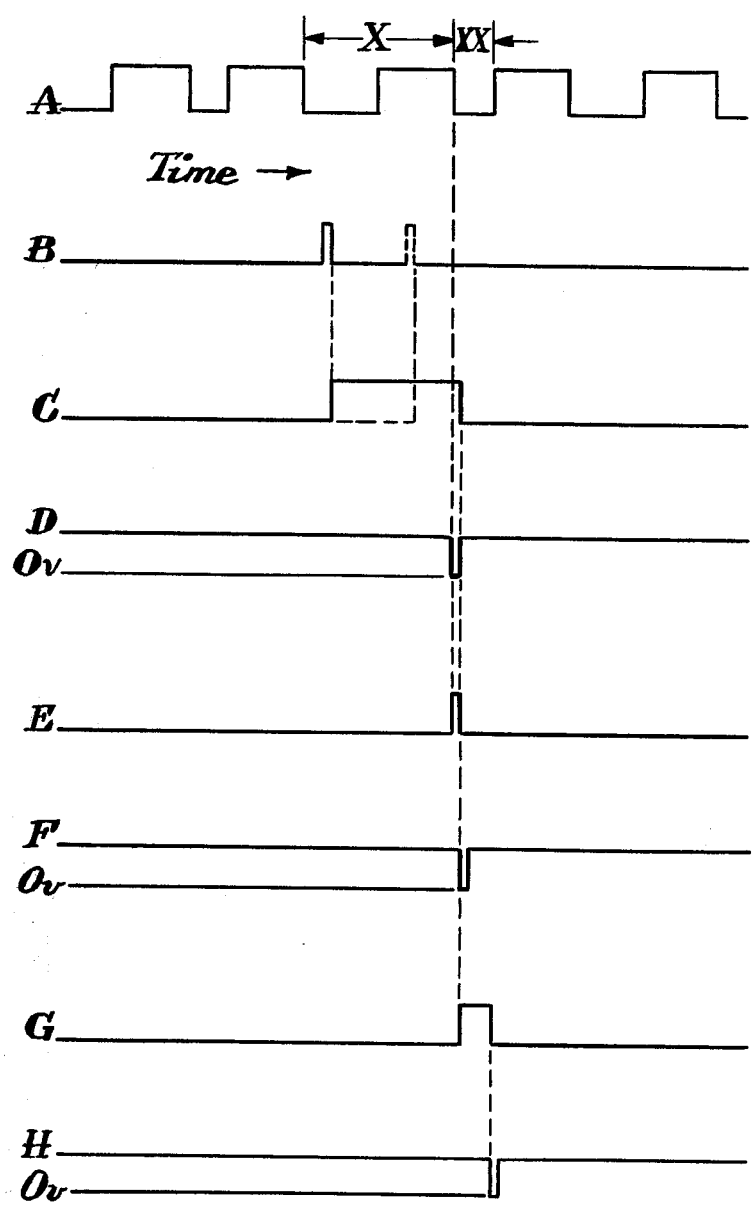

ELECTRICAL PULSE TRAIN COMPARATOR

BACKGROUND OF THE INVENTION

In the analysis of rotating machinery, it is sometimes necessary to determine the relative movement of two elements. For example, in some manufacturing processes, it is necessary that two rolls be rotating absolutely in phase with each other, independent of the speed at which they are rotating. This may be accomplished by driving one roll by a motor and driving the second roll by means of a drive train connected to the first roll. In this way whatever rotational characteristics the first roll has should be imparted through the drive train to the second roll. The drive train used, however, may contain gears, timing belts, or other power transmission elements, and any backlash, misshapen teeth, or mechanical damage in such gears and belts will cause the rotational characteristics of the driven roll to vary considerably from theoretical coordination. If the frequency of the phase differences between the driving and the driven roll can be determined, the source of the phase errors can be pinpointed, since the frequency of the phase error will correspond to some characteristic frequency of the element causing it. By "frequency" here is meant the frequency with respect to the driving roll, not with respect to time. The necessary information can be obtained using digital pulse encoders coupled to the shafts of the two rolls. Each of these encoders emits a series of electrical pulses, each pulse corresponding precisely to a definite amount of shaft rotation. By comparing the number of pulses output by the two encoders, it is possible to compare the amounts of rotation of the two shafts.

In other situations, it may be necessary to determine rotational characteristics with respect to time. In these cases, the output of a digital pulse encoder coupled to the rotating element of interest can be compared to a pulse train emitted by an oscillating crystal or other generator of a known, fixed frequency.

Thus, the reference pulse train can be generated by the drive source for the driven mechanism whose characteristic is being simultaneously measured, or it can be generated by a fixed frequency oscillator, depending upon whether the measured characteristic is to be compared to the driving source or to time.

The function of the invention system is to count the two pulse trains simultaneously and record or display the number of pulses received from the caracteristic pulse train for each n pulses received from the reference pulse train, where n is a preselected number chosen to give the required resolution, the value of which is approximately dependent upon the expected frequencies of the vibration or repetitive error sought. This information provides a direct measure of the magnitude of phase errors in the system and, in addition, can be used in a variety of mathematical analyses which provide information on the frequencies of the errors.

A typical conventional apparatus consists primarily of two counters, digital control logic, and means for recording or displaying data received from the counters. Each pulse train constitutes an imput to a counter. The counters are connected through digital logic such that, when the number in the counter associated with the reference pulse generator reaches a preset value, a transfer pulse is generated and the number stored in the second (or measurement) counter is immediately transferred to storage or display means, after which both counters are reset to zero to begin another cycle. Conventional apparatus of this type is usually accurate to within one pulse per each n pulse total reading, the inaccuracy occurring whenever a transfer signal is generated at the same instant that a pulse is entering the second counter. When this happens, the number presently stored in the counter is transferred, the counter is reset, and the pulse then entering the counter is dropped, the next pulse generated being counted as the first pulse in a new cycle. For many applications this accuracy is quite sufficient. However, as hereinafter explained, there are times when it is entirely unacceptable for this "pulse dropping" to exist.

For example, it is sometimes desirable to be able to take data which can be used to detect errors over a relatively wide range of frequencies. Such a situation would exist where a drive train includes a timing belt which is long compared to the distance from one gear tooth to the next. For a complete analysis, it is necessary to have data capable of revealing discrepancies in the tooth-to-tooth spacing as well as cyclic errors which repeat only once or twice in a single travel cycle of the belt. Thus, both high and low frequency errors must be discerned. It is obvious that the conventional apparatus could take data which would be useful for detecting tooth-to-tooth discrepancies simply by choosing n, the number of reference pulses per reading, corresponding exactly with the amount of reference shaft rotation, to be small enough to take a reading each time a tooth passes a given point. Similarly, n might be chosen to be large enough to take one or two readings per travel cycle of the belt.

If, instead of taking data at this low frequency, that is, once or twice in each revolution of the belt, one attempts to utilize the higher frequency data to analyze low frequency errors, the interval of interest spans not one or two dropped pulses but many, many times that number. This can lead to entirely unacceptable levels of inaccuracy, especially where the investigator is interested in absolute positions of the shaft being measured. For this reason, it is necessary to take data at each frequency which yields meaningful results. This can be burdensome when, for instance, there are a number of components in a drive train and all are possible sources of error.

It is an object of this invention to provide an apparatus which is capable of comparing two electrical pulse series without troublesome pulse dropping.

It is another object of this invention to provide improved apparatus which is capable of taking data useful for simultaneous high and low frequency error detection and analysis.

It is a further object of the invention to provide an improved apparatus capable of taking data useful for detecting absolute velocity variations.

BRIEF SUMMARY OF THE INVENTION

Briefly, this invention consists of a modification in an electrical pulse train comparison apparatus incorporating a measuring pulse encoder and a reference pulse source, a measuring pulse counter and a reference pulse counter summing the number of pulses received from said measuring pulse encoder and said reference pulse source, respectively, a presettable count range comparator receiving the pulse count from the reference counter, a comparator counter signalling when the pulse count received in the comparator equals the preset range of the comparator, and means for resetting the reference, comparator and measuring counters, the improvement comprising a computer having a computer interface connected to receive the total count stored in the measuring counter once per measuring cycle, and a memory circuit to (1) effect the transfer of data from the active (measuring pulse counter) register to an associated buffer register, (2) reset the active (measuring pulse counter) register to zero and (3) effect the transfer of data from the buffer register to the computer via the computer interface, the memory circuit delaying transfer of data from the active register of the measuring pulse counter until the sensing by the memory circuit of the trailing edge of the next measured pulse occurring after receipt of the signalling that the count received in the comparator equals the preset range of the comparator.

THE DRAWINGS

FIG. 1 is a block diagram of a preferred embodiment of this invention,

FIG. 2 is a circuit diagram of the memory circuit of the apparatus of FIG. 1, and FIG. 3 is a schematic oscilloscope timing diagram showing the time interrelationship of the several pulses processed by the apparatus of FIGS. 1 and 2.

DETAILED DESCRIPTION OF THE INVENTION

Referring to FIG. 1, the invention is described in regard to comparison of a rotating driven member 7 with respect to a rotating element 6 of a driving mechanism, the output shaft of the driving mechanism being denoted 8 whereas the output shaft of the driven member is denoted 9. Each rotating shaft is provided with a conventional pulse generator (hereinafter called "encoders") outputting pulses for each gear tooth or other chosen mechanical feature to be analyzed moving past the encoders, which can both be Dynamic Research Models 35, optically sensing the transit of radial scribed lines on a rotating glass disc, encoder 10 typically having a range of 7,200 pulses/revolution whereas encoder 11 typically has a range of 36,000 pulses/revolution. The sensing glass discs of encoders 10 and 11 are clamped directly to shafts 8 and 9, respectively, so that rotation of the shafts rotates the glass discs in the encoders. Thus, the drive of the encoder discs is not dependent on gear teeth or other mechanical connections but solely on shaft rotation itself. It will be noted that each encoder has two output lines, one corresponding to each direction of rotation, so that the respective counters 12 and 13 add pulses from the encoder channel representing forward rotation of their associated shafts and subtract the pulses from the other channel, so that the number summed in each counter represents the net forward rotation of the shafts.

Reference counter 12 and measuring counter 13 can each constitute Electronic Research Corporation Models 2310, counter 13 being provided with a conventional specified auxiliary register, not detailed. Such auxiliary registers are conventional, in that they function as buffer output lines which store the contents of the active register while the active register is being reset for repetition of the counting cycle.

Counter 12 outputs its pulses via line 30 to serial comparator 14 having its count limit preset via thumbwheel input line 14a. Comparator 14 can typically be an Electronic Research Corporation Model 2500 Input Counter. Counter 13 outputs its pulses via its internal auxiliary register and thence, as a total, via line 31 to computer interface 16, typically a Digital Equipment Corporation DEC Model DR11.

Since the two pulse counts supplied by the comparison apparatus are raw data for subsequent operational analyses evaluating machine performance, the most efficient mode of handling is to supply the pulse count data directly to a computer 15, typically a Digital Equipment Corporation DEC Model PDP11, receiving its input from interface 16 via line 32.

Data counter 17, typically an Electronic Research Corporation Mode 2500 Input Counter, BCD type (similar to comparator 14), has means 17a permitting entering of a preselected total limit and means for generating an output signal when the number stored in the counter reaches this preselected limit.

Thus, the output pulse signal B from comparator 14 is emitted once each single cycle of the comparison apparatus, whereas the output signal from counter 17 (not denoted by a separate alphabetic letter) is routed to logic circuit 18 only when a preset total number of comparison cycles (typically, 500) has elapsed.

Single cycle output pulse B is fed back via line 33 to the reset terminal of counter 12, to switch counter 12 back to zero count and thereupon immediately commence counting of the next-succeeding cycle. Pulse B are also routed to counter 17 via line 34 to sum the analyses cycles one at a time until counter 17's preset total is reached, when it outputs a signal to conventional logic circuit 18.

Logic circuit 18 then resets counters 12, 13 and 17 to zero and, in addition, halts operation of the entire system, by signals routed via lines 35 and 36.

Comparator 14 signal B is routed to memory circuit 20 via line 37, as is also the pulse train A output from OR gate 19 via line 24, which transmits pulses of both polarities from encoder 11.

Referring to FIG. 2, memory circuit 20 comprises three conventional flip-flop units 21, 22 and 23, and two conventional one-shots 24 and 25.

Output B, the transfer pulse, from comparator 14 is entered as the clock input of flip-flop 21 whose output C is a data input to connection J of second flip-flop 22. The feedback connection 47 running from terminal $\overline{Q}$ to terminal J of flip-flop 21, is conventional and insures logic one maintenance on the gate in that, once it is there, further B pulse input is ineffective to switch flip-flop 21. The K terminals of all of the flip-flops 21, 22 and 23 are grounded as shown. Pulse train A is connected as the clock input of flip-flop 22, under which circumstances a state of logic 1 in output C enables the second flip-flop 22 to change states as signal A changes from logic 1 to logic 0, thus switching output D from logic 1 to logic 0. This switch of output D from logic 1 to logic 0 triggers the first one-shot 24 to produce a pulse E which enters the second one-shot 25 via line 38 as well as the clock input of flip-flop 23 via line 39. In addition, pulse E is the counter transfer pulse routed to counter 13 via line 40 (see also FIG. 1) thereby effecting the actual transfer of data from the counter 13 counting register into the buffer output lines of counter 13 (not detailed). The output F of one-shot 25 is connected via lines 41 and 42 to the reset inputs of flip-flops 21 and 22, respectively, and, also, via line 43, to counter 13 as reset pulse. Output pulse G from flip-flop 23 is transmitted to computer interface 16 via line 44 and triggers computer interface 16 to read the counter 13 output through line 31. Pulse H is a reset signal output from computer interface 16 to flip-flop 23 via line 45. Line 26 connects the J terminal of flip-flop 23 to an automatic mode switch (not detailed) in logic circuit 18 (refer FIGS. 1 and 2).

Referring to FIGS. 2 and 3, the operation of memory circuit 20 is as follows:

The pulses in characteristic measured pulse train A are supplied over line 24, via OR gate 19, to the clock input of second memory flip-flop 22. Transfer pulse B from comparator 14 enters the first memory flip-flop 21. This pulse B can occur when output A is in logic state 0, i.e., "between pulses", as indicated in solid line representation in FIG. 3, or when output A is in logic state 1, i.e., "during a pulse", as indicated in broken line representation in FIG. 3. The falling (trailing) edge of pulse B switches output C from logic 0 to logic 1, after which C enters conditional input terminal J of the second memory flip-flop 22. This switches output D from logic 1 to logic 0 on the falling (trailing) edge of the next-occurring pulse A. The falling (leading) edge of pulse D triggers the transfer one-shot 24 which generates transfer pulse E.

Transfer pulse E causes the data in the characteristic measuring pulse counter 13 to be transferred to its buffer output lines internal of counter 13. The falling (trailing) edge of pulse E sets the computer read flip-flop 23 (via lline 39), switching output G to a logic 1 and, at the same time, triggers the reset memory one-shot 25 (via line 38), generating pulse F, which resets the characteristic measuring pulse counter 13, as well as the first and second memory flip-flops 21 and 22, thus returning signals C and D to logic states 0 and 1, respectively.

The change in output G triggers computer interface 16 (FIG. 1) causing data to be transferred from the buffer output lines 31 of pulse counter 13 via computer interface 16 into computer storage. When this transfer is completed, signal H is generated by computer interface 16 to reset flip-flop 23 via line 45, which thereupon switches output G to logic 0.

As shown in FIG. 3, it is seen that the data stored in counter 13 will not be transferred to the counterbuffer lines and the counter reset except between pulses in the pulse train A which counter 13 is counting, i.e., during the time XX in FIG. 3, regardless of whether a transfer pulse B is received from comparator 14 between pulses A, or while a pulse A is being counted, i.e., the time interval labeled X.

Moreover, should a transfer pulse B be received from comparator 14 between pulses A, the transfer will not occur until the end of the next pulse A, to assure sufficient time for the transfer of data and the reset of counter 13 before the beginning of the next pulse A to be counted. Therefore, the speed at which the system is run is limited only by the requirement that the time between pulses in pulse train A be sufficient for both pulses E and F to be generated by one-shots 24 and 25, so that the transfer and reset of data in counter 13 occurs before the first pulse of the new pulse train data set enters the counter to be counted.

One decided advantage of this invention over conventional pulse train comparators is that data can be taken at any frequency desired and then consecutive data added to represent lower frequencies without a loss in accuracy.

It will be understood that logic circuit 18 is not essential to the operation of this invention. It is thus practicable, instead, to substitute manual control by employing an "off" switch, connected across a battery (not shown), which switch can be closed when the experimenter decides that he has accumulated a sufficient number of consecutive data points.

Moreover, if time comparison is desired, a conventional electric oscillator can be substituted for the reference pulse generator inclusive of encoder 10 and the balance of the apparatus shown in FIG. 1 utilized as hereinbefore described.

What is claimed is:

1. In an electrical pulse train comparison apparatus including a measuring pulse encoder and a reference pulse source, a measuring pulse counter and a reference pulse counter, each summing respectively the number of pulses received from said measuring pulse encoder and said reference pulse source, a presettable count range comparator receiving the pulse count from said reference counter, said comparator generating a signal when the count received in said comparator equals the preset range of said comparator, and means for resetting said comparator and said reference and measuring counters, the improvement comprising:
   a computer having a computer interface; and
   a memory circuit means connected between said measuring pulse counter and said computer interface and responsive to said comparator signal, for delaying the transfer of the total count stored in said measuring pulse counter to said computer interface and the resetting of said pulse measuring counter until after a sequential detection of the trailing edge of the next-following measured pulse from said measuring pulse encoder occurring after receipt of said comparator signal by said memory circuit means.

* * * * *